UNITED STATES PATENT OFFICE.

EDWARD A. LOCKE, OF BOSTON, MASSACHUSETTS, ASSIGNOR OF ONE-HALF OF HIS RIGHT TO UNION STONE COMPANY.

IMPROVEMENT IN COMPOSITION GRAVE-STONES, MONUMENTS, &c.

Specification forming part of Letters Patent No. 131,010, dated September 3, 1872.

SPECIFICATION.

*To all whom it may concern:*

Be it known that I, EDWARD A. LOCKE, of Boston, in the State of Massachusetts, have invented an Improved Head-Stone or Grave-Stone; and I do hereby declare the following to be a full and correct description of the same.

I have been especially led to make this invention through a desire to furnish a suitable head-stone to be used in cemeteries in the neighborhood of the battle-fields of the war, where it cannot be expected that there will be great contrasts in monuments and grave-stones, but where, on the contrary, there must be of necessity great uniformity in all that relates to the burial of the dead, and where it is desirable to furnish proper and fitting stones at little cost.

Such a head-stone may be made in the following manner: I take any suitable stone and reduce it to a powder—for instance, sand-stone, or slate, or a mixture of marble and slate. Following the instructions set forth in the several Letters Patent of the United States granted Stanislas Sorrel for improvement in the manufacture of artificial stone and cements for the same—viz., Letters Patent No. 53,092, dated March 6, 1866; Letters Patent No. 100,944, dated March 15, 1870; and Letters Patent No. 100,945, dated March 15, 1870—I use oxide of magnesium as a base, and mix with it, in a dry state, a powder of the kind mentioned above, substantially in the manner indicated in the first of the above-named patents, and afterward moisten the mixture, as in the said patent directed, with chloride of magnesium, or with any of the equivalents thereof, as set forth in the last of the above-named patents; or the oxide and chloride of zinc may be substituted for the oxide and chloride of magnesium, in which case I mix and incorporate with the above-mentioned powder in a dry state from about ten to about twenty per cent. in weight of the oxide of zinc and moisten the mixture with the chloride of zinc until it will hold the shape given to it by compressing in the hand.

In whatever way prepared the moistened mixture from which the stone is to be formed is molded to the required shape by direct pressure or tamping. After a short time it will sufficiently harden without the application of heat.

The mold in which the stone is shaped is prepared in the ordinary way, one face of the mold containing the reverse of such emblems or inscriptions as shall be common to many stones, and having the ordinary devices for inserting movable dies or types, so far as may be necessary, to indicate an individual.

I do not, however, confine myself to the above-mentioned cements and ingredients for forming artificial stone. I merely mean to point out a means for forming a suitable artificial stone. Any artificial stone of sufficient strength and fineness will answer my purpose.

Head-stones thus prepared, with the exception of more or less of the lettering, may be kept on hand for use at military garrisons, hospitals, and other public institutions, in the same manner as coffins. But in such cases a part of the inscription must be cut, and, therefore, the powder mixed with the cement for forming the stone must be of such a nature as to allow the stone to be cut without destroying its edge.

When, however, the oxide and chloride of magnesium, or the oxide and chloride of zinc, is used as a cement in making artificial stone, the stone can be cut, whatever stone may be used as a filling, if the latter be reduced to a powder sufficiently fine.

I claim—

As a new article of manufacture, a grave-stone prepared substantially as described.

The above specification of my said invention signed and witnessed at Boston this 24th day of June, 1872.

EDWARD A. LOCKE.

Witnesses:
WILLIAM W. SWAN,
CHARLES A. FOSTER.